United States Patent
Weinstein et al.

(10) Patent No.: US 8,746,338 B2
(45) Date of Patent: Jun. 10, 2014

(54) WELL TREATMENT METHODS AND SYSTEMS

(75) Inventors: Jeremy L. Weinstein, Tomball, TX (US); Richard S. Wheeler, Crosby, TX (US)

(73) Assignee: Baker Hughes Incorporated, Houston, TX (US)

( * ) Notice: Subject to any disclaimer, the term of this patent is extended or adjusted under 35 U.S.C. 154(b) by 134 days.

(21) Appl. No.: 13/363,013

(22) Filed: Jan. 31, 2012

(65) Prior Publication Data

US 2012/0231982 A1 Sep. 13, 2012

Related U.S. Application Data

(60) Provisional application No. 61/451,212, filed on Mar. 10, 2011.

(51) Int. Cl.
*E21B 43/22* (2006.01)

(52) U.S. Cl.
USPC ........................................ 166/279; 300/305.1

(58) Field of Classification Search
CPC .......... B01F 15/02; C09K 8/80; E21B 43/267
USPC .................. 166/305.1, 280.1, 280.2; 266/295
See application file for complete search history.

(56) References Cited

U.S. PATENT DOCUMENTS

| | | | |
|---|---|---|---|
| 5,190,374 A | 3/1993 | Harms et al. | |
| 5,382,411 A | 1/1995 | Allen | |
| 5,426,137 A | 6/1995 | Allen | |
| 6,796,704 B1 | 9/2004 | Lott | |
| 7,048,432 B2 | 5/2006 | Phillippi et al. | |
| 7,104,328 B2 | 9/2006 | Phillippi et al. | |
| 7,581,872 B2 | 9/2009 | Allen | |
| 7,762,340 B2 | 7/2010 | Pich et al. | |
| 7,794,135 B2 | 9/2010 | El Kholy et al. | |
| 7,814,977 B2 | 10/2010 | Pich et al. | |
| 2008/0041449 A1 | 2/2008 | Schauerte | |
| 2008/0264641 A1 | 10/2008 | Slabaugh et al. | |

FOREIGN PATENT DOCUMENTS

CA 2220972 C 3/1999

OTHER PUBLICATIONS

International Search Report & Written Opinion dated Mar. 1, 2013 issued in PCT/US2012/026388.
A Better Choice for Mixing; Mixing and Blending; Compatible Components Corporation; http://www.cccmix.com/mixing-and-blending.
Quadro; Quadro Ytron XC Disperser; http://www.quadroytron.com/products_xc_disperser.asp.
Silverson, Flashmix, http://www.silverson.com/us/flashmix-technical-information.html.
Ross, High Speed Dispersers, Copyright 2006, Charles Ross & Son Company, http://www.mixers.com/Proddetails.asp?ProdID=82.

*Primary Examiner* — Zakiya W Bates
*Assistant Examiner* — Silvana Runyan
(74) *Attorney, Agent, or Firm* — Parsons Behle & Latimer

(57) ABSTRACT

A well treatment method includes drawing a solvent to a first pump, drawing a wetting liquid to a second pump, pumping the wetting liquid through a polymer mixer using the second pump, combining polymer with the wetting liquid to produce a slurry containing undissolved polymer, and combining the slurry with the solvent upstream from the first pump. Another well treatment method includes increasing dissolution time of the polymer by providing a buffering agent in the wetting liquid before combining the wetting liquid and the polymer. A well treatment system includes a polymer mixing subsystem with a mix loop having a mix loop inlet line from a first pump feed line and a mix loop outlet line back to the first pump feed line, the mix loop outlet line containing a polymer mixer.

24 Claims, 2 Drawing Sheets

WELL TREATMENT METHODS AND SYSTEMS

RELATED APPLICATION DATA

The present application claims the benefit of priority under 35 U.S.C. §119 to U.S. Provisional Application No. 61/451,212 filed Mar. 10, 2011, entitled "Well Treatment Methods and Systems," which is incorporated herein by reference.

BACKGROUND

The embodiments described herein relate generally to well treatment methods and systems.

A variety of known processes are used in the oil and gas industry to treat wells extending into subterranean formations. Oil and gas well treatments include well completion, production stimulation, fluid loss control, and water production control. Gels comprise one of a variety of materials used in the technology to accomplish these treatments.

Fracture stimulation may be used to increase the production of hydrocarbons from wells, such as in lower quality reserves. Known practices include forming a well bore in a subterranean formation and inserting a well casing in the well bore. Perforations in sections of a well casing allow fracturing fluid at high pressure to initiate and then propagate a fracture in the formation during each fracturing stage while a proppant carried by the fracturing fluid lodges in the fractures. A viscosifying agent, such as a gel, may assist with suspending proppant carried by the fracturing fluid to reduce settling before the proppant flows into the fractures. Gel may provide other benefits.

Known polymers for producing gel used in fracturing or other treatment fluids include natural polymers, such as, guar gum, xanthan gum, and hydroxyethylcellulose (HEC) along with chemically modified guar gum derivatives, including hydroxypropyl guar (HPG), carboxymethylhydroxypropyl guar (CMHPG) and carboxymethyl guar (CMG). Natural polymers used for well treatment are often obtained as solids, for example, powders or flakes. The solid polymer is dissolved in a solvent to provide a gel. For the case of water-soluble polymers, dissolution of the solid may involve hydration in water as the solvent. The polymer may be mixed with a carrier fluid at a polymer to carrier fluid ratio to achieve desired gel properties. The carrier fluid is often an aqueous-based fluid, although other fluids are known.

A significant amount of energy and space in known well treatment processes may be committed to dissolving polymers in preparing gels. Accordingly, further advancement in well treatment methods and systems may be of benefit.

SUMMARY

A well treatment method includes drawing a solvent from a first liquid source to a first pump, drawing a wetting liquid from a second liquid source to a second pump separate from the first pump, and pumping the wetting liquid through a polymer mixer using the second pump. Polymer is supplied from a polymer feeder to the polymer mixer and therein combined with the wetting liquid to produce a slurry containing undissolved polymer. The method includes combining the slurry with the solvent upstream from the first pump and, using the first pump, pumping the combined slurry and solvent to a gel reservoir. The polymer is dissolved to produce a gel and the gel is used in a well treatment process.

Another well treatment method includes drawing a solvent from a first liquid source to a first pump and drawing a wetting liquid from a second liquid source to a second pump separate from the first pump and pumping the wetting liquid through a polymer mixer using the second pump. Polymer is supplied from a polymer feeder to the polymer mixer and therein combined with the wetting liquid to produce a slurry containing undissolved polymer. The method includes increasing dissolution time of the polymer by providing a buffering agent in the wetting liquid before combining the wetting liquid and the polymer, combining the slurry with the solvent, and, using the first pump, pumping the combined slurry and solvent to a gel reservoir. Polymer is dissolved to produce a gel and the gel is used in a well treatment process.

A well treatment system includes a polymer mixing subsystem having a first pump, a feed line to the first pump, a discharge line from the first pump, and a mix loop. The mix loop includes a second pump separate from the first pump, a mix loop inlet line to the second pump from the first pump feed line, and a mix loop outlet line from the second pump back to the first pump feed line, the mix loop outlet line including a polymer mixer. The system includes a polymer feeder configured to supply polymer to the polymer mixer, a flow meter in the first pump discharge line or in the first pump feed line between the mix loop outlet line and the first pump, and a process control device operably linking polymer feed rate provided by the polymer feeder and flow rate determined by the flow meter.

Figure 1:
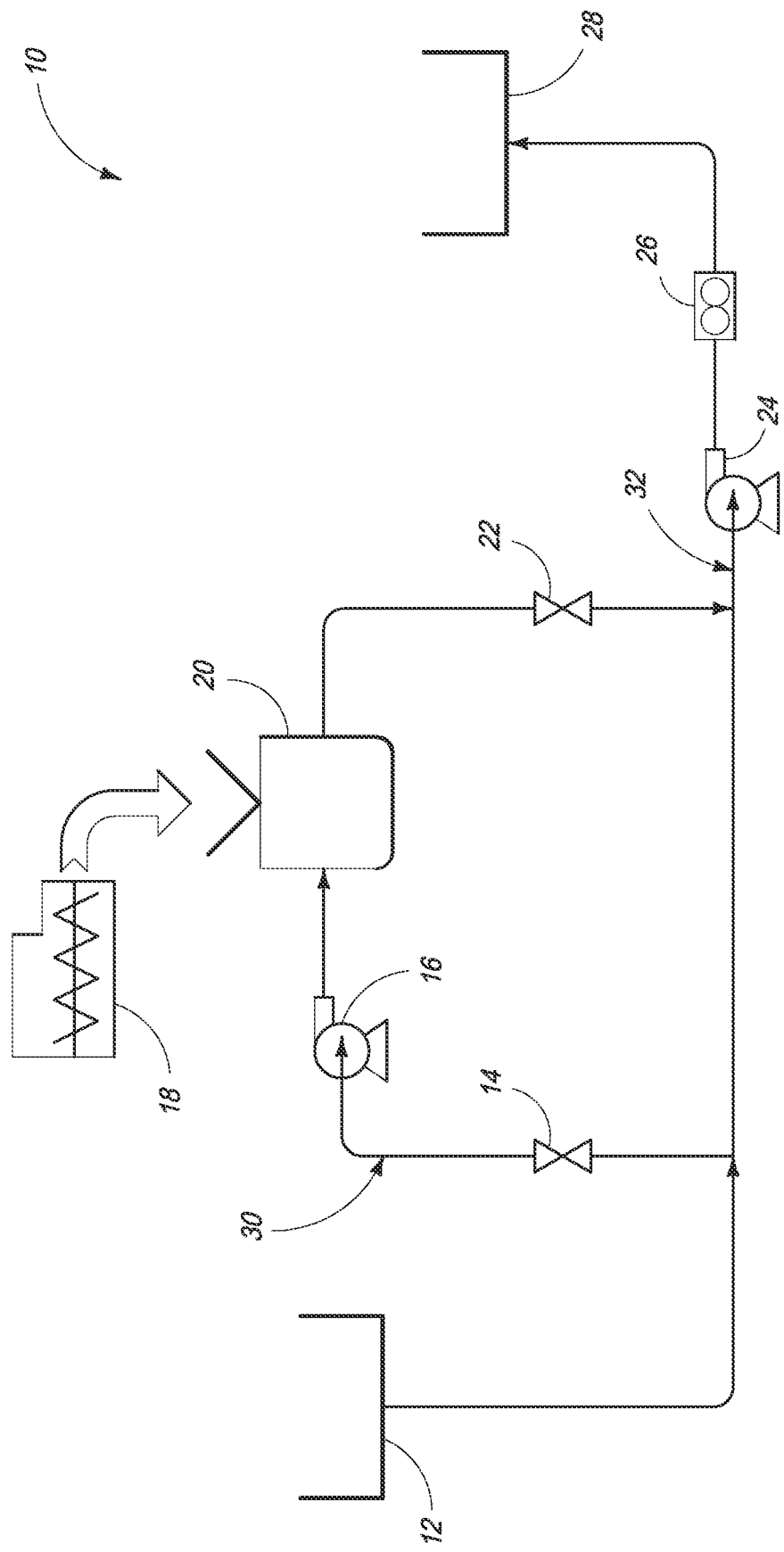
FIG. 1 is a process flow diagram of part of a well treatment system according to an embodiment.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to include all modifications, equivalents and alternatives encompassed by the appended claims.

DETAILED DESCRIPTION

To reduce the energy consumed and the space utilized for preparing liquid polymer from solid polymer in a well treatment process, solid polymer may be dispersed in a solvent at a concentration of merely enough to produce a pumpable slurry containing the solvent and undissolved polymer. Even though the volume of solvent might be insufficient to dissolve the polymer, a volume may be selected, depending on the properties of the polymer, sufficient to disperse the polymer in the solvent. Thereafter, dissolution may occur in the full amount of solvent desired for dissolution to a concentration that will be used or stored in concentrated form for subsequent dilution.

In such a multistage process, solid polymer may rapidly disperse in solvent to avoid agglomeration of polymer particles (e.g., "fish eyes"), while reducing the energy consumption and size of process equipment compared to known methods. The initial dispersion and subsequent dilution may occur rapidly enough that the slurry and the subsequently combined slurry and solvent exhibit approximately the same physical properties as the solvent alone. Properties of the slurry are largely unaffected by the polymer that is only beginning to dissolve (or hydrate in the case where water is the solvent).

According to an embodiment, a well treatment method includes drawing a solvent from a first liquid source to a first pump and drawing a wetting liquid from a second liquid source to a second pump separate from the first pump. The method includes pumping the wetting liquid through a polymer mixer using the second pump. Polymer is supplied from a polymer feeder to the polymer mixer and therein combined with the wetting liquid to produce a slurry containing undissolved polymer. The method includes combining the slurry with the solvent upstream from the first pump and, using the first pump, pumping the combined slurry and solvent to a gel reservoir. The polymer is dissolved to produce a gel and the gel is used in a well treatment process.

By way of example, the first liquid source and the second liquid source may be the same liquid source or, instead, may be different. Either way the liquid source(s) may include a water tank. Accordingly, the solvent may include water such that the dissolution of the polymer involves hydration of the polymer. It is conceivable that the wetting liquid may be a hydrocarbon, such as mineral oil or diesel, to form the slurry. A hydrocarbon wetting liquid may be used when the solvent used to dissolve the polymer is water or when the solvent is alcohol or hydrocarbon. The polymer may include a solid, such as powder or flakes, although it is conceivable that the embodiments herein may be useful for diluting liquid polymers to desired concentrations. Possible polymers include guar, guar derivatives, xanthan, hydroxyethylcellulose, hydroxypropyl guar (HPG), carboxymethylhydroxypropyl guar (CMHPG), carboxymethyl guar (CMG), and combinations thereof.

The method may further include determining flow rate of the combined slurry and solvent, then adjusting the feed rate of the polymer based on the flow rate or adjusting the flow rate based on the polymer feed rate. That is, in one control scheme a flow rate for the combined slurry and solvent is selected and then polymer feed rate is adjusted to provide a desired polymer concentration in the combined slurry and solvent. In another control scheme, polymer feed rate is matched to a desired loading rate of polymer into a well and then the combined slurry and solvent flow rate is adjusted to provide a desired polymer concentration. The polymer and the wetting liquid may be provided in respective amounts that would be insufficient to produce a pumpable material if the amount of polymer and the amount of wetting liquid were allowed to complete solvation. That is, if as much of the wetting liquid as is provided solvates with the polymer, then the combination would not be pumpable. The combined polymer and wetting liquid is then diluted with solvent.

In another embodiment, a well treatment method includes drawing a solvent from a first liquid source to a first pump and drawing a wetting liquid from a second liquid source to a second pump separate from the first pump. The method includes pumping the wetting liquid through a polymer mixer using the second pump. Polymer is supplied from a polymer feeder to the polymer mixer and therein combined with the wetting liquid to produce a slurry containing undissolved polymer. The method includes increasing dissolution time of the polymer by providing a buffering agent in the wetting liquid before combining the wetting liquid and the polymer. The slurry and the solvent are combined and, using the first pump, pumped to a gel reservoir. The polymer is dissolved to produce a gel and the gel is used in a well treatment process. By way of example, the method may further include decreasing dissolution time of the polymer by providing another buffering agent in the combined slurry and solvent.

Although the rapidity of the polymer and wetting liquid combination followed by further combination of the slurry with the solvent may be sufficient to provide adequate dispersion, the process window may be increased in length with the use of a buffering agent. Known buffering agents for aqueous systems have been used to retard hydration of polymers by increasing pH to 9 or greater. Accordingly, providing the buffering agent in the wetting liquid before combining the wetting liquid and the polymer may lengthen the process window during which the polymer and wetting liquid may be combined in the polymer mixer and thereafter combined with the solvent before properties of the slurry transition to be significantly different from those of the solvent alone.

Generally, known methods possess an objective of accelerating hydration to reduce holding times for hydrating gel and to allow greater process responsiveness. Thus, it may be counterintuitive to retard hydration intentionally. If a buffering agent is used to retard hydration during dispersion, or even if it is not, then another buffering agent may be thereafter used to accelerate hydration by decreasing pH to 7 or less. Such a subsequent use of a buffering agent to decrease dissolution time after use of a buffering agent to increase dissolution time may counteract a disadvantage to decreasing dissolution time while still increasing length of the process window for combination of the polymer and wetting liquid. In this manner, the likelihood of forming agglomerates may be reduced.

In a further embodiment, a well treatment method includes, using a suction pump, pumping a hydration liquid from a liquid source through a suction line to the suction pump and from the suction pump through a discharge line to a gel reservoir. Using a boost pump separate from the suction pump, a portion of the liquid from the suction pump suction line is pumped as a wetting liquid through a mix loop inlet line to the boost pump and from the boost pump through a mix loop outlet line back to the suction pump suction line.

The method includes supplying polymer from a polymer feeder to a polymer mixer in the mix loop outlet line and therein mixing the wetting liquid and the polymer to produce a slurry containing unhydrated polymer. The slurry flows through the mix loop outlet line into the hydration liquid in the suction pump suction line and, using the suction pump, the combined slurry and hydration liquid is pumped to the gel reservoir. The method includes using a flow meter in the suction pump discharge line or in the suction pump suction line between the mix loop outlet line and the suction pump and determining a flow rate of the combined slurry and hydration liquid. A process control device operably linked to the polymer feeder and suction pump is used to adjust the polymer feed rate based on the flow rate or to adjust the flow rate based on the polymer feed rate. The polymer is hydrated to produce a gel and the gel is used in a well treatment process.

By way of example, the flow meter may be selected to be in the suction pump discharge line. While a variety of flow meters may be used, magnetic or other flow meters that do not induce a significant pressure drop may be used on either the suction side or the discharge side of the suction pump. However, a turbine or orifice plate flow meter would normally be used on the discharge side of the suction pump due to the pressure drop induced. The polymer and the wetting liquid may be provided in respective amounts that would be insufficient to hydrate fully the polymer if the amount of polymer and the amount of wetting liquid were allowed to complete hydration.

FIG. 1 shows a process flow diagram of a well treatment system 10 including a water tank 12, a gel tank 28, and a polymer mixing subsystem comprising the other components. The polymer mixing subsystem includes a suction pump 24, a suction line to suction pump 24 connected to water tank 12, and a discharge line from suction pump 24 connected to gel tank 28. The polymer mixing subsystem also includes a mix loop. The mix loop in turn includes a boost pump 16, a mix loop inlet line to boost pump 16 from the suction pump suction line, and a mix loop outlet line from boost pump 16 back to the suction pump suction line. The mix loop outlet line includes a polymer mixer 20. A polymer feeder 18 of the polymer mixing subsystem is configured to supply polymer to polymer mixer 20. The polymer mixing subsystem further includes a flow meter 26 in the suction pump discharge line and a process control device (not shown) operably linking polymer feed rate provided by polymer feeder 18 and flow rate determined by flow meter 26.

As may be appreciated from the description herein, well treatment system 10 may be used to efficiently produce a gel by hydrating a polymer with water from water tank 12. Well treatment system 10 may also be suitable for use with other solvents. The polymer mixing subsystem includes an isolation valve 14 and an isolation valve 22 to isolate the mix loop for maintenance or other purposes. Embodiments of a well treatment method described herein may be performed in well treatment system 10. As such, the polymer mixing subsystem of well treatment system 10 further includes a buffer addition port 30 used to increase pH and a buffer addition port 32 used to decrease pH. Buffer addition ports 30/32 thus allow some control over hydration rate of polymer in well treatment system 10.

Figure 2:
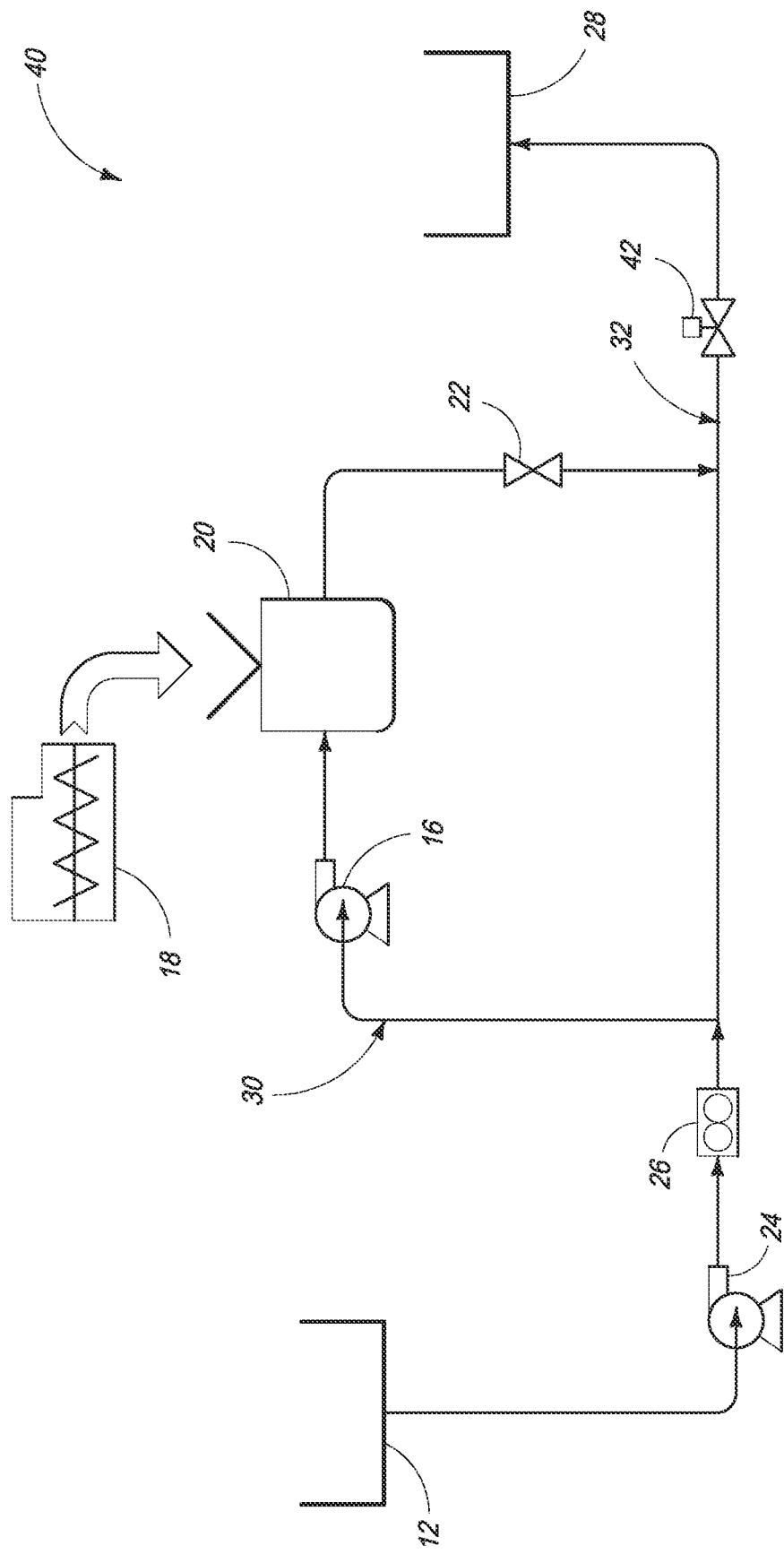
FIG. 2 is a process flow diagram of part of a well treatment system according to another embodiment.

FIG. 2 shows a process flow diagram of a well treatment system 40. All of the components of well treatment system 10 shown in FIG. 1 are also included in well treatment system 40. However, the location of suction pump 24 and flow meter 26 is altered to be upstream from the mix loop inlet line to boost pump 16. With such change, a back pressure valve 42 is provided to produce stable flow at low flow rates. US Pat. Pub. No. 2008/0264641, published Oct. 30, 2008, describes a similar process flow diagram in its FIG. 5. In contrast, some of the embodiments herein describe combining wetting liquid/polymer slurry with a solvent upstream from a first pump, such as suction pump 24. Such feature of a method is not performed in the well treatment system 40 of FIG. 2 since the mix loop inlet and outlet lines are downstream from suction pump 24. However, other embodiments herein described may be performed in well treatment system 40. For example, the method of increasing dissolution time of the polymer by providing a buffering agent in the wetting liquid may be performed in well treatment system 40.

In operating well treatment system 10, boost pump 16 may operate at a fixed rate (revolutions per minute (rpm)). Polymer mixer 20 presents a fixed resistance in the mix loop; therefore, the mix loop may operate at a fixed wetting fluid flow rate and pressure, as provided by boost pump 16. Suction pump 24 may operate at a variable rate (rpm) to adjust flow rate to gel tank 28 as determined by flow meter 26. Polymer flow rate provided by polymer feeder 18 is then adjusted based on flow rate of the slurry and water through flow meter 26. With a constant wetting fluid flow rate and variable polymer flow rate, polymer concentration in the slurry varies, but provides a desired concentration after combination with the controlled flow rate of hydrating liquid (water). Gel tank 28 may provide suitable residence time to achieve complete hydration and a desired viscosity for the gel to function as a viscosifying agent in well treatment processes.

Known mixing technologies may be used in polymer mixer 20, for example, a rotary shear device, a high shear eductor, or an open vessel with a high shear head. Respective examples include a FLASHMIX FMX available from Silverson in Chesham, United Kingdom, an AZ MIXING EDUCTOR available from Compatible Components Corporation in Houston, Tex., and a High Speed Disperser available from Charles Ross & Son Company in Hauppauge, N.Y.

In operating well treatment system 40, some differences exist compared to operating well treatment system 10. For example, a process stability benefit in reduced slurry variability may be obtained by operating polymer mixer 20 at a fixed pressure. Well treatment system 10 allows polymer mixer 20 to operate at fixed pressure in a more robust process control scheme than can be arranged in well treatment system 40. In system 40, the operational rate (rpm) of boost pump 16 may be varied to accommodate pressure fluctuations in the discharge line of suction pump 24, from which boost pump 16 draws its feed. However, in system 10, pressure in the suction line of suction pump 24 varies much less, if at all, even when operational rate (rpm) is varied according to desired flow rates. Since boost pump 16 draws its feed from the suction line in well treatment system 10, the control of boost pump 16 may be simplified as boost pump 16 essentially operates at a fixed rate to provide a fixed pressure to polymer mixer 20.

In a further embodiment, a well treatment system includes a polymer mixing subsystem. The subsystem includes a first pump, a feed line to the first pump, and a discharge line from the first pump. A mix loop includes a second pump separate from the first pump, a mix loop inlet line to the second pump from the first pump feed line, and a mix loop outlet line from the second pump back to the first pump feed line. The mix loop outlet line includes a polymer mixer. The subsystem includes a polymer feeder configured to supply polymer to the polymer mixer and a flow meter in the first pump discharge line or in the first pump feed line between the mix loop outlet line and the first pump. A process control device operably links polymer feed rate provided by the polymer feeder and flow rate determined by the flow meter.

By way of example, the well treatment system may include a liquid source connected to the feed line of the polymer mixing subsystem and a gel reservoir connected to the discharge line of the polymer mixing subsystem. Consequently, the polymer mixing subsystem may be mounted on a portable platform, such as a skid, easily relocated, and redeployed after connection to a water tank and a gel tank.

Although various embodiments have been shown and described, the present disclosure is not so limited and will be understood to include all such modifications and variations as would be apparent to one skilled in the art.

| TABLE OF REFERENCE NUMERALS FOR FIGS. 1 AND 2 |
| --- |
| 10 polymer mixing subsystem |
| 12 water tank |
| 14 isolation valve |
| 16 boost pump |
| 18 polymer feeder |
| 20 polymer mixer |
| 22 isolation valve |
| 24 suction pump |
| 26 flow meter |
| 28 gel tank |
| 30 buffer addition port |
| 32 buffer addition port |
| 40 polymer mixing subsystem |
| 42 back pressure valve |

What is claimed is:

1. A well treatment method comprising:
   drawing a solvent from a first source to a first pump using the first pump;

drawing a wetting liquid from the first source or a different second source to a second pump separate from the first pump and pumping the wetting liquid through a polymer mixer using the second pump;

supplying polymer from a polymer feeder to the polymer mixer and therein combining the wetting liquid and the polymer to produce a slurry containing undissolved polymer;

combining the slurry with the solvent upstream from the first pump and, using the first pump, pumping the combined slurry and solvent to a gel reservoir; and dissolving the polymer to produce a gel and using the gel in a well treatment process.

2. The method of claim 1 wherein wetting liquid is drawn from the first source and the first source comprises a water tank.

3. The method of claim 1 wherein the solvent comprises water.

4. The method of claim 1 wherein the polymer comprises a solid.

5. The method of claim 1 wherein the polymer comprises guar, guar derivatives, xanthan, hydroxyethylcellulose, hydroxypropyl guar (HPG), carboxymethylhydroxypropyl guar (CMHPG), carboxymethyl guar (CMG), and combinations thereof.

6. The method of claim 1 further comprising determining flow rate of the combined slurry and solvent and adjusting feed rate of the polymer based on the flow rate or adjusting the flow rate based on the polymer feed rate.

7. The method of claim 1 wherein the first pump is a suction pump and the second pump is a boost pump.

8. The method of claim 1 further comprising increasing dissolution time of the polymer by providing a buffering agent in the wetting liquid before combining the wetting liquid and the polymer.

9. The method of claim 1 further comprising decreasing dissolution time of the polymer by providing a buffering agent in the combined slurry and solvent.

10. The method of claim 1 wherein the polymer and the wetting liquid are provided in respective amounts that would be insufficient to produce a pumpable material if the amount of polymer and the amount of wetting liquid were allowed to complete solvation.

11. The method of claim 1 wherein the combined slurry and solvent pumped using the first pump contains undissolved polymer.

12. A well treatment method comprising:

drawing a solvent from a first source to a first pump using the first pump;

drawing a wetting liquid from the first source or a different second source to a second pump separate from the first pump and pumping the wetting liquid through a polymer mixer using the second pump;

supplying polymer from a polymer feeder to the polymer mixer and therein combining the wetting liquid and the polymer to produce a slurry containing undissolved polymer;

increasing dissolution time of the polymer by providing a buffering agent in the wetting liquid before combining the wetting liquid and the polymer;

combining the slurry with the solvent and, using the first pump, pumping the combined slurry and solvent to a gel reservoir; and dissolving the polymer to produce a gel and using the gel in a well treatment process.

13. The method of claim 12 further comprising decreasing dissolution time of the polymer by providing another buffering agent in the combined slurry and solvent.

14. The method of claim 12 wherein the combined slurry and solvent pumped using the first pump contains undissolved polymer.

15. A well treatment method comprising:

using a suction pump, pumping a hydration liquid from a liquid source through a suction line to the suction pump and from the suction pump through a discharge line to a gel reservoir;

using a boost pump separate from the suction pump, pumping a portion of the hydration liquid from the suction pump suction line as a wetting liquid through a mix loop inlet line to the boost pump and from the boost pump through a mix loop outlet line back to the suction pump suction line;

supplying polymer from a polymer feeder to a polymer mixer in the mix loop outlet line and therein mixing the wetting liquid and the polymer to produce a slurry containing unhydrated polymer;

flowing the slurry through the mix loop outlet line into the hydration liquid in the suction pump suction line and, using the suction pump, pumping the combined slurry and hydration liquid to the gel reservoir;

using a flow meter in the suction pump discharge line or in the suction pump suction line between the mix loop outlet line and the suction pump, determining a flow rate of the combined slurry and hydration liquid;

using a process control device operably linked to the polymer feeder and suction pump, adjusting the polymer feed rate based on the flow rate or adjusting the flow rate based on the polymer feed rate; and hydrating the polymer to produce a gel and using the gel in a well treatment process.

16. The method of claim 15 wherein the flow meter is in the suction pump discharge line.

17. The method of claim 15 further comprising increasing hydration time of the polymer by providing a buffering agent in the wetting liquid before mixing the wetting liquid and the polymer and then decreasing hydration time of the polymer by providing another buffering agent in the combined slurry and hydration liquid.

18. The method of claim 15 wherein the polymer and the wetting liquid are provided in respective amounts that would be insufficient to hydrate fully the polymer if the amount of polymer and the amount of wetting liquid were allowed to complete hydration.

19. A well treatment system comprising a polymer mixing subsystem including:

a first pump, a feed line to the first pump, and a discharge line from the first pump;

a mix loop including a second pump separate from the first pump, a mix loop inlet line to the second pump from the first pump feed line, and a mix loop outlet line from the second pump back to the first pump feed line, the mix loop outlet line including a polymer mixer;

a polymer feeder configured to supply polymer to the polymer mixer;

a flow meter in the first pump discharge line or in the first pump feed line between the mix loop outlet line and the first pump; and a process control device operably linking polymer feed rate provided by the polymer feeder and flow rate determined by the flow meter.

20. The system of claim 19 wherein the well treatment system includes a liquid source connected to the feed line of the polymer mixing subsystem and a gel reservoir connected to the discharge line of the polymer mixing subsystem.

21. The system of claim 19 wherein the process control device is configured to adjust the polymer feed rate based on the flow rate or is configured to adjust the flow rate based on the polymer feed rate.

22. The system of claim 19 further comprising a buffering agent addition device in the mix loop inlet line and another buffering agent addition device in the first pump feed line between the mix loop outlet line and the first pump or in the first pump discharge line.

23. The system of claim 19 wherein the polymer mixing subsystem is mounted on a portable platform.

24. The system of claim 19 wherein the mix loop inlet line is separate from the first pump feed line.

* * * * *